United States Patent [19]

Gemp

[11] 4,213,191
[45] Jul. 15, 1980

[54] VARIABLE LENGTH DELAY LINE

[75] Inventor: Robert S. Gemp, Williamsville, N.Y.

[73] Assignee: Westinghouse Electric Corp., Pittsburgh, Pa.

[21] Appl. No.: 887,288

[22] Filed: Mar. 16, 1978

Related U.S. Application Data

[62] Division of Ser. No. 774,726, Mar. 7, 1977, Pat. No. 4,131,936.

[51] Int. Cl.² ............................................. G11C 13/00
[52] U.S. Cl. ........................................ 365/73; 365/238
[58] Field of Search .................... 365/73, 238, 74, 75, 365/76; 328/37

[56] References Cited

U.S. PATENT DOCUMENTS

| | | | |
|---|---|---|---|
| 3,141,153 | 7/1964 | Klein | 365/73 |
| 3,644,906 | 2/1972 | Weinberger | 365/238 |
| 3,772,658 | 11/1973 | Sarlo | 365/238 |

*Primary Examiner*—Terrell W. Fears
*Attorney, Agent, or Firm*—C. M. Lorin

[57] ABSTRACT

A variable length delay line comprises a random-access-memory (RAM) device in which a selected shift between read and write addresses establishes the desired amount of delay.

3 Claims, 5 Drawing Figures

VARIABLE LENGTH DELAY LINE

GOVERNMENT CONTRACT

The invention herein described was made in the course of or under a contract or subcontract thereunder with the Department of the Navy.

This is a Division of Application Ser. No. 774,726, filed Mar. 7, 1977, now U.S. Pat. No. 4,131,936.

BACKGROUND OF THE INVENTION

The present invention relates to digital delay lines in general, and more particularly to an improved variable length digital delay line.

Digital delay lines are well known, which are used to introduce a phase delay between two signals, in particular between logic signals each having two opposite logical states as a function of time. For instance, U.S. Pat. No. 3,588,707 of R. A. Manship uses a tapped shift register to create a digital time delay of various length.

It is also known from U.S. Pat. No. 3,760,280 of M. T. Covington to control the delay of an analog signal in response to a control signal by conversion through a voltage controlled oscillator into a binary signal which is frequency modulated, using a shift register as a delay line, which is actuated by a clock.

An object of the present invention is to provide an improved digital delay line.

Another object of the present invention is to use a random access memory device for providing a variable length digital delay line.

SUMMARY OF THE INVENTION

A variable length delay line is provided which is controllable to establish a time delay between an inputted digital signal and an outputted digital signal.

The delay line according to the invention comprises a random access memory (RAM) device of n locations, a selector for alternately establishing a write and read mode of operation of the RAM device, first means operative in the write mode for distributing cyclically the inputted signal through a sequence of n write locations in the RAM device, second means operative in the read mode for deriving cyclically the outputted signal from a sequence of n read locations in said RAM device, the write and read locations being separated by a predetermined number of locations which define the time delay.

BRIEF DESCRIPTION OF THE DRAWINGS

FIGS. 4A and 4B show signals A and B before and after symmetrical shifting to the right and the left.

DETAILED DESCRIPTION OF THE INVENTION

A novel and unique type of delay line has been conceived the operation of which will be schematically explained by reference to FIGS. 1, 2 and 3. The variable length delay lines $D_1$, $D_2$, $D_3$ and $D_4$ of FIG. 3 have n steps defined by n locations in a memory each step representing an elementary time interval $\Delta t$ of a counter $CN_2$. Two inputted signals A and B shown in FIG. 4A are stored in digital form into the memories thus achieving together a representation of the function inputted.

Figure 3:
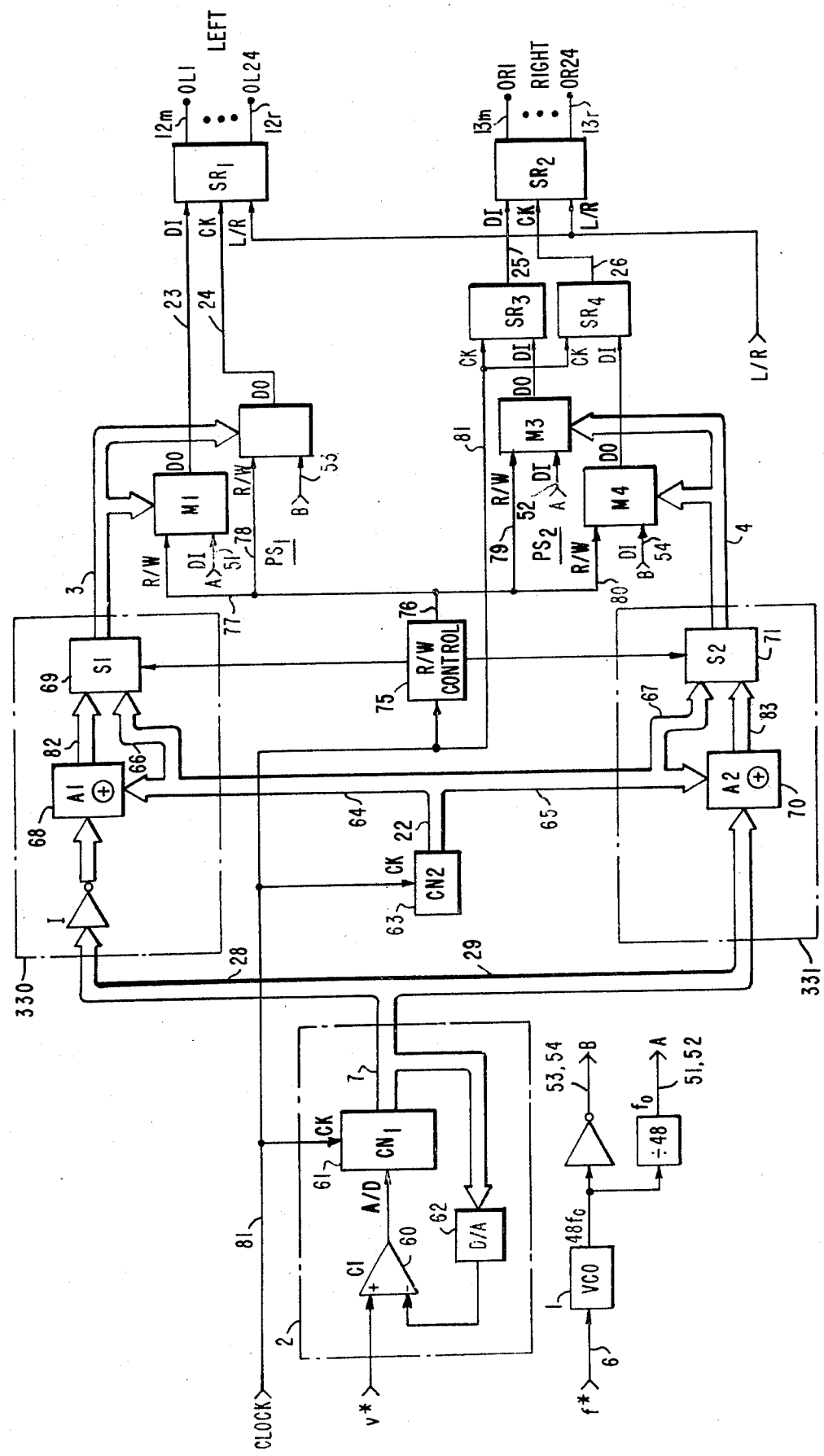
FIG. 3 shows an embodiment of the variable length delay line according to the invention.
Figure 4B:
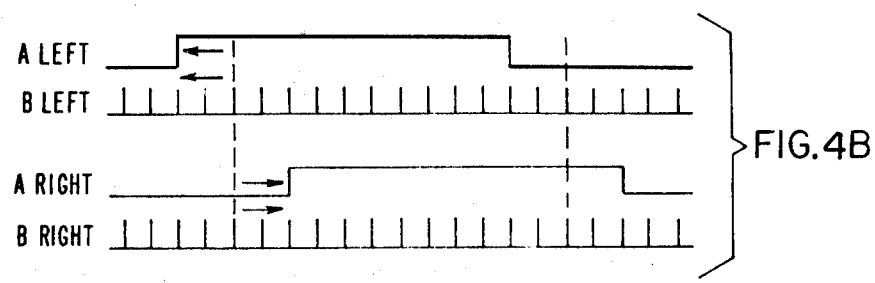

FIG. 4B shows the relationship of signals A and B when they are symmetrically shifted relative to one another in time. The signals shifted to the right by SR1 are used in FIG. 3 for the generation of signal commands on lines $12m-12r$, the signals shifted to the left by SR2 are used for the generation of signal commands $13m-13r$. The method of shifting signals A and B shown in FIG. 4B has the advantage that synchronism of signals A and B is not affected by shifting, since B is an exact submultiple of A.

The outputted function of line 23, 24, 25 or 26 (FIG. 3) is derived by reading, with a read signal R, the information out of the memories, with a time delay introduced by selecting address locations which are lagging by so many locations behind the write signal W.

Figure 1:
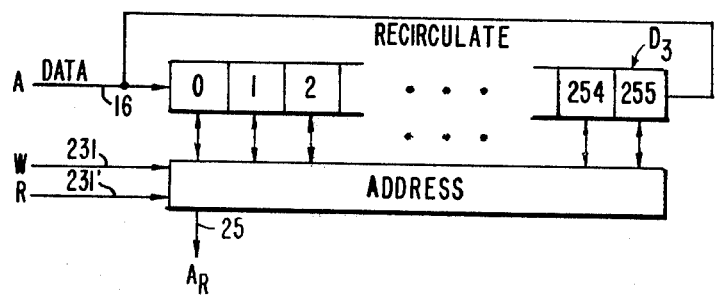
FIG. 1 schematically shows a digital memory used in circuit as a variable length of delay line.
Figure 2:
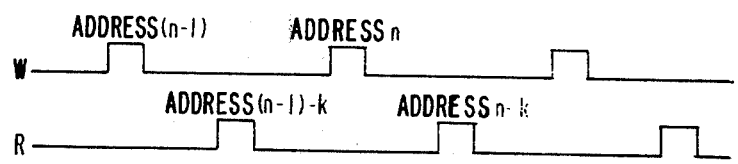
FIG. 2 depicts the write and read signals used to control the amount of delay between an inputted signal and an outputted signal.
Figure 5:
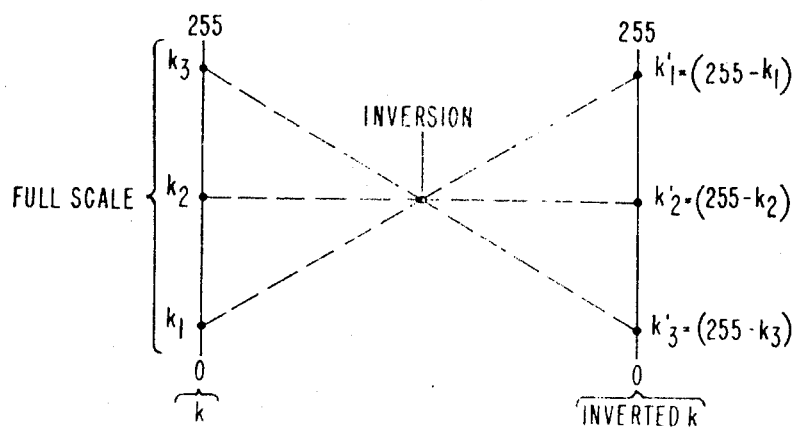
FIG. 5 is a nomograph illustrating the inversion of the binary number controlling the operation of the comparators of FIG. 3.

Referring to FIG. 1, the delay line is illustrated as a memory of 256 locations. Data representing wave A are inputted sequentially over line 16 and stored successively and progressively into all the memory locations, from 0 to 255 under control of a write signal W (FIG. 2) applied on line 231. A read signal R (FIG. 2) is applied on line 231 addressing the locations successively but counting with a lag of so many locations representing in real time the delay $\alpha$ between the locations due to signals W and R (FIG. 2).

In the embodiment of FIG. 3, a time delay $\tau$ has been chosen to be the maximum number of locations n in the delay line. Shift registers $SR_3$ and $SR_4$ of n time intervals $\Delta t$ are used. Considering $D_1-D_4$ as four identical variable length delay lines according to the invention, thus such as shown in FIG. 1, the first reading in $D_1$ is effected under $(\tau - K \times \Delta t)$ at the last location 256, while the first reading in $D_3$ is effected under $+K \times \Delta t$ at a location counted at $K \times \Delta t$ from the first location (thus to the right). Shift registers $SR_3$ and $SR_4$ introduce relative to $D_3$ and $D_4$ a constant delay equal to 255 times the elementary time interval $\Delta t$ provided by the clock, thus $\tau$ as delay.

Referring to FIG. 3, a control system for a six-stage inverter belonging to a harmonic neutralization arrangement is shown in which left register $SR_1$ and right register $SR_2$ have six stages with corresponding outputs $12m-12r$ and $13m-13r$, respectively. The six output lines from $SR_1$ are applied to the left poles $OL_1-OL_6$ of inverters and similarly the six output lines from $SR_2$ apply the right shift command signals for the various stages to the right poles $OR_1-OR_6$. $SR_1$ and $SR_2$ are solid state devices known in the open market as MO14034. For shift register $SR_1$ a signal A shifted to the left is applied from line 23 to the data input of the device. A signal B shifted to the left is applied on line 24 to the clock input of the device. The same type of connections exist for shift register device $SR_2$ and input signals $A_R$, $B_R$ on lines 25, 26 thereto.

The left phase shifter $PS_1$ and the right phase shifter $PS_2$ are shown in FIG. 3 to include memory devices, $M_1$, $M_2$, $M_3$, $M_4$ used as delaying devices. Variable length shift registers of 256 steps are not readily available. However, this function is simulated by a 256 bit random access memory RAM. Memories $M_1$ through $M_4$ may consist of four 256 bit RAM's, or two 512 bit RAM's, or one 1024 bit RAM. In the latter case a standard 2102 MOS memory can be used. It is understood that 256 locations is a matter of choice, and taking a larger or lesser number of steps depends upon the particular design.

$M_1$ and $M_3$ receive on respective input lines 51, 52 a digital representation of signal A. $M_2$ and $M_4$ receive on respective input lines 52, 54 a digital representation of signal B. Signals A and B are generated in digital form from a common VCO circuit 1 operating at 48 times the fundamental frequency $f_o$ of the sinusoidal wave to be outputted. This frequency is established by reference frequency signal $f^*$ appearing on line 6. Along one channel from the output of the VCO the signal is inverted in order to produce the B signal on lines 53, 54. A divider by 48 yields on a second channel from the same output signal A which appears on lines 51, 52. Signal A is applied as data to memory devices $M_1$, $M_3$. Signal B is applied as data to memory devices $M_2$, $M_4$. The read and write signals (R, W) of FIG. 2 are generated by a read-write control circuit 75. The R/W control circuit 75 is a standard generator network for the proper timing of memory read, write and enable lines. The signals outputted therefrom are applied to the four memories $M_1$–$M_4$ via respective lines 77, 78, 79 and 80.

FIG. 3 also shows on the left-hand side a conventional A/D converter circuit used to generate on lines 7 digital representations of the analog voltage reference signal $v^*$ of line 5. Circuit 2 includes an 8-bit up-down digital counter $CN_1$, synchronized with a clock from line 81 in order to generate the digital equivalent of signal $v^*$. Circuit 2 also comprises an operational amplifier comparator 60 from which is derived an input determining the count direction of a counter $CN_1$. A feedback loop including a digital to analog converter 62 is established between the digital output of counter $CN_1$ and the negative input of operational amplifier comparator 60 thereby to form an error signal by difference with the reference signal $v^*$ applied at the positive input thereof. This is conventional circuitry.

The circuitry most responsible for the generation of the time delay imposed to the inputted signals A and B of lines 51–54 will now be described in detail.

On line 7, counter $CN_1$ provides a digital count representing signal $v^*$ after the error signal due to the feedback loop has established through amplifier 60 a count level corresponding to the new level of the reference $v^*$. On line 7 a count level representing $v^*$ is established due to the fact that the digital count of $CN_1$ in the A/D converter 2 cannot change faster than the memories $M_1$–$M_4$ can be written into, or read out. Therefore, a count appears on line 7 which is applied on lines 28 and 29. The signal of line 28 is inverted by $I_1$ and applied in this form to a comparator 330. It is observed here that comparator 8 of FIG. 6 breaks down here into two comparators 330 and 331, one for each channel. The signal of line 29 is directly applied to comparator 331. Comparators 30 and 31 include devices 68 and 70 which are conventional adders known in the open market as CD4008, 4-bit full adder. The count of line 28 is inverted by circuit $I_1$. A free running counter $CN_2$ synchronized with the clock signal on line 81, generates on lines 64 and 65 a digital count representing an accumulated count of elementary time intervals $\Delta t$, $n\Delta t$. Thus, a count $n\Delta t$ is applied to the comparators 330 and 331.

Counter $CN_2$, like counter $CN_1$, is an up-down counter of the type CD4029 but operating in the down mode only. The two adders 68, 70 respectively form, as previously explained, the counts $255-K \times \Delta t$ and $+K \times \Delta t$. Circuits 330 and 331 also include, at 69 and 71 respectively, selectors $S_1$ and $S_2$ which are used to address the memories either in the writing or in the reading mode as prescribed by the R/W control circuit 75. $S_1$ generates the address to memories $M_1$ and $M_2$, $S_2$ generates the address to memories $M_3$ and $M_4$. Selectors $S_1$ and $S_2$ are preferably solid state devices known on the open market as CD4019. Selector $S_1$ has two inputted digital numbers. One on line 82 from circuit 68 is equal to $n\Delta t + 255\Delta t - K \times \Delta t$ as used for read addresses. The second on line 66 is the counter $CN_2$ output $n\Delta t$ used for write addresses. Similarly, selector $S_2$ has two inputted digital numbers, $+K\Delta t + n\Delta t$ from line 83 and count $n\Delta t$ on line 67 directly from counter $CN_2$. The read-write R/W control circuit 75 is a standard sequential network for proper timing of memory read, write and enable lines. It generates the non-concurrent control signals R, W of FIG. 2. Under W, selector $S_1$ passes the write address $n \times \Delta t$ from line 66 onto lines 3 to memories $M_1$, $M_2$. Under R, selector $S_1$ passes the read address $255\Delta t - K\Delta t + n\Delta t$ to memories $M_1$, $M_2$. The same signals R,W also gate $S_2$ to pass write address $n\Delta t$ from line 67, or read address $K \times \Delta t + n\Delta t$ from line 83, onto lines 4 to memories $M_3$, $M_4$. It is clear from what has been said earlier that R/W control circuit 75 enables alternate storing and reading of the memories $M_1$–$M_4$ to provide a time shift between the representations of A and B, as written under the W signal, and the information readout under the R signal. Therefore on lines 23 and 24 respective signals $A + 255\Delta t - K \times \Delta t$ and $B + 255\Delta t - K \times \Delta t$ are generated, while on lines 25, 26 are derived $A + K\Delta t$ and $B + K\Delta t$. The organization just described still leaves a time shift of 255 elementary time intervals $\Delta t$ between the $K \times \Delta t$ counts of the left and right channels. As explained hereinbefore, register $SR_3$ and $SR_4$ are provided to compensate for this and establish symmetrical shifts $-K \times \Delta t$ and $+K \times \Delta t$ from a common origin defined by those 255 elementary time interval delays.

Referring to FIG. 4, the operation of inverter $I_1$ can be explained as follows:

From A/D converter 2 is derived on lines 7, 28 and 29 a digital signal K. This digital number is converted by inverter $I_1$ into $(255-K)$ as can be seen from the nomograph of FIG. 15. The graph represents on two parallel scales the signals of line 29 at the input of adder 70 and of line 28 at the input of adder 68. The inverting function establishes between these two inputs the relation $K' = (255-K)$ where values $K'$ correspond to line 28 and values K to line 29. Counter $CN_2$ adds the instantaneous count $n\Delta t$ on lines 22 and 64, 65 to values $255-K$ and K so that at the output of adders 68 and 70 counts $(255-K+n)\Delta t$ and $(K+n)\Delta t$ are derived. These are applied respectively to delay lines $M_1$, $M_2$ and $M_3$, $M_4$ as earlier described.

What is claimed is:

1. In a digital delay line apparatus including a delay line having a plurality of memory locations; and
    means for addressing said memory locations in a write mode to store therein in a recirculated manner a digital signal and for addressing said memory locations in a read mode to retrieve the stored digital signal; the combination of:
    free-running counter means for generating a first instantaneous count;
    said addressing means being responsive to said first instantaneous count as a write address for said memory locations in the write mode for storing said digital signal; and means responsive to said first instantaneous count and to a predetermined count for generating a second instantaneous count, said second instantaneous count differing from said first instantaneous count by said predetermined count;

said addressing means being responsive to said second instantaneous count as a read address for said memory locations in the read mode for retrieving said stored digital signal;

whereby said digital signal is retrieved with a delay equal to said predetermined count.

2. The apparatus of claim 1 with said predetermined count being adjustable in relation to a control signal for adjusting said signal delay.

3. The apparatus of claim 2 with said delay line consisting in at least one random-access-memory (RAM) device.

* * * * *